United States Patent
Suharno et al.

(10) Patent No.: US 7,905,095 B2
(45) Date of Patent: Mar. 15, 2011

(54) SYSTEM FOR REFRIGERANT CHARGING WITH CONSTANT VOLUME TANK

(75) Inventors: Anwar Suharno, Barrington, IL (US); Dean P. Pfefferle, Elgin, IL (US); Craig F. Govekar, Gurnee, IL (US); Kenneth R. Meldahl, Fox Lake, IL (US); Larry G. Moller, Harvard, IL (US)

(73) Assignee: SPX Corporation, Charlotte, NC (US)

( * ) Notice: Subject to any disclaimer, the term of this patent is extended or adjusted under 35 U.S.C. 154(b) by 960 days.

(21) Appl. No.: 10/892,161

(22) Filed: Jul. 16, 2004

(65) Prior Publication Data

US 2006/0010898 A1    Jan. 19, 2006

(51) Int. Cl.
F25B 45/00    (2006.01)

(52) U.S. Cl. .................................. 62/77; 62/149; 62/292

(58) Field of Classification Search .............. 62/77, 126, 62/149, 292, 208, 228.3
See application file for complete search history.

(56) References Cited

U.S. PATENT DOCUMENTS

| 4,261,178 A | * | 4/1981 | Cain .............................. 62/149 |
| 4,285,206 A | * | 8/1981 | Koser ............................ 62/126 |
| 4,470,265 A | * | 9/1984 | Correia ........................... 62/77 |
| 5,046,322 A | * | 9/1991 | Bulla et al. ...................... 62/126 |
| 5,249,434 A | * | 10/1993 | Abraham ........................ 62/292 |
| 5,285,647 A | * | 2/1994 | Manz et al. ..................... 62/127 |
| 5,392,639 A | * | 2/1995 | Manz ........................... 73/61.76 |
| 5,406,806 A | * | 4/1995 | Ricketts et al. ................. 62/149 |
| 5,758,506 A | * | 6/1998 | Hancock et al. ................. 62/77 |
| 6,442,963 B1 | * | 9/2002 | Pfefferle et al. ................ 62/475 |
| 2003/0005752 A1 | * | 1/2003 | Shin et al. .................... 73/54.01 |

FOREIGN PATENT DOCUMENTS

| DE | 38 00 055 A1 | 7/1988 |
| JP | 54-51045 | 4/1979 |
| JP | 2001324097 A * | 11/2001 |
| WO | WO 03/089853 A1 | 10/2003 |

* cited by examiner

Primary Examiner — Mohammad M Ali
(74) Attorney, Agent, or Firm — Baker & Hostetler LLP

(57) ABSTRACT

A refrigerant charging system for charging a refrigeration system with refrigerant includes a refrigerant source, a storage vessel, input and output lines, and a device for detecting mass of refrigerant within the storage vessel. The input line fluidly connects the refrigerant source to the storage vessel, and the output line extends from the storage vessel and is adapted to connect to the refrigeration system. The system also includes an input control valve disposed between the storage vessel and the refrigerant source, and an output control valve disposed between the storage vessel and the refrigeration system. A heater is connected to the refrigerant source for raising the temperature of refrigerant within the refrigerant source. A method of charging a refrigeration system is also disclosed. The system and method are useful to charging the refrigerant system of an automotive vehicle, among others.

17 Claims, 2 Drawing Sheets

SYSTEM FOR REFRIGERANT CHARGING WITH CONSTANT VOLUME TANK

TECHNICAL FIELD

The disclosure relates generally to refrigerant charging systems and, more specifically, to a high precision refrigerant charging system using a constant volume tank.

BACKGROUND ART

Most refrigeration systems are not 100% free of leaks. Thus, the amount (or mass) of refrigerant within the refrigeration system decreases over time. Refrigeration systems, however, are designed to operate with a specific amount of refrigerant. Therefore, loss of refrigerant in a refrigeration system over time typically reduces the efficiency of the refrigeration system. Also, if the amount of refrigerant in the refrigeration system drops to a certain level, the refrigeration system may cease to operate and/or be damaged. For these reasons, a common maintenance operation for a refrigeration system is to recharge the refrigerant within the refrigeration system.

The recharging operation typically involves flushing the refrigeration system of any remaining refrigerant and, if present, other materials within the refrigeration system. Once the refrigeration system is flushed, a predetermined amount of new refrigerant is introduced into the refrigeration system. An important component of conventional refrigeration charging systems is the device that measures the amount of refrigerant introduced into the refrigeration system. Since the refrigeration system is designed to operate with a specific amount of refrigerant, too little or too much refrigerant can reduce the effectiveness of the recharging operation.

One conventional device used to measure the amount of refrigerant introduced into the refrigeration system is a load cell (or scale). Essentially, the load cell measures the weight of a tank containing the refrigerant before the refrigerant is introduced into the refrigeration system and then afterwards. The difference between the two readings is the amount of refrigerant introduced into the refrigeration system. There are, however, certain problems that are associated with the use of a load cell in conventional recharging systems. Load cells are sensitive to vibration, which can throw off the measurements. Also, since the load cell determines the weight of the entire tank used to supply the refrigerant, which can weigh several hundred pounds or more, sensitivity of the load cell is reduced.

Furthermore, recent advances in refrigeration technology employ carbon dioxide as the refrigerant, which is stored at a pressure as much as ten times higher than the pressure at which conventional refrigerants are stored, and the resulting increase in storage pressure necessitates thicker walls for the tank. These thicker walls add additional weight to the tank, which further decreases the sensitivity of the load cell.

Another conventional device used to measure the amount of refrigerant introduced into the refrigeration system employs mass flow technology. As recognized by those skilled in the art, mass flow technology implements a sensor that measures the flow rate of fluid (i.e., the refrigerant) flowing past a certain point. However, use of mass flow technology is very expensive, and the expense is even greater when an increased sensitivity for calculating the amount of refrigerant delivered is desired. The accuracy of mass flow technology is dependent on the fluid state since the mass flow sensors do not measure gas as well as liquid. Although most refrigerants are in a liquid form during the recharging operation, carbon dioxide is in a gaseous state during a recharging operation. Also, mass flow technology does not work well with two-phase fluids. There is, therefore, a need for an refrigerant charging system and method that is more accurate and vibration-resistant, and less expensive than conventional refrigeration charging systems.

SUMMARY OF THE DISCLOSURE

Described is a system for charging a refrigeration system with refrigerant. The charging system includes a refrigerant source, a storage vessel, input and output lines, and a device for detecting mass of refrigerant within the storage vessel. The input line fluidly connects the refrigerant source to the storage vessel, and the output line extends from the storage vessel and is adapted to connect to the refrigeration system. The recharging system may also include an input control valve disposed between the storage vessel and the refrigerant source, and an output control valve disposed between the storage vessel and the refrigeration system. A heater may optionally be connected to the refrigerant source for raising the temperature of refrigerant within the refrigerant source.

The refrigeration system is charged with refrigerant by determining mass of refrigerant needed to charge the refrigeration system and transferring refrigerant from a refrigerant source to a storage vessel. An initial mass of refrigerant in the storage vessel is determined after the refrigerant is transferred to the storage vessel. The refrigerant is then transferred from the storage vessel to the refrigeration system, and the mass of refrigerant transferred to the refrigeration system is determined. The determined mass of refrigerant transferred to the refrigeration system is compared with the determined mass of refrigerant for charging. If the total mass of refrigerant transferred to the refrigeration system does not equal the determined mass of refrigerant for charging, the steps of transferring refrigerant from the refrigerant source to the storage vessel and transferring refrigerant from the storage vessel to the refrigeration system are repeated.

The mass of refrigerant transferred to the refrigeration system is calculated by comparing the initial mass with a remaining mass of refrigerant within the storage vessel, which is determined based on temperature and pressure of the refrigerant in the storage vessel. While determining the mass of refrigerant within the storage vessel, the volume of the storage vessel remains constant. The storage vessel is fluidly disconnected from the refrigeration system prior to determining the remaining mass of refrigerant, and the refrigerant source is fluidly disconnected from the storage vessel prior to determining the initial mass of refrigerant.

Additional advantages will become readily apparent to those skilled in the art from the following detailed description, wherein only an exemplary embodiment of the present invention is shown and described, simply by way of illustration of the best mode contemplated for carrying out the present invention. As will be realized, the disclosure is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DETAILED DESCRIPTION OF THE PREFERRED EMBODIMENTS

Figure 1:
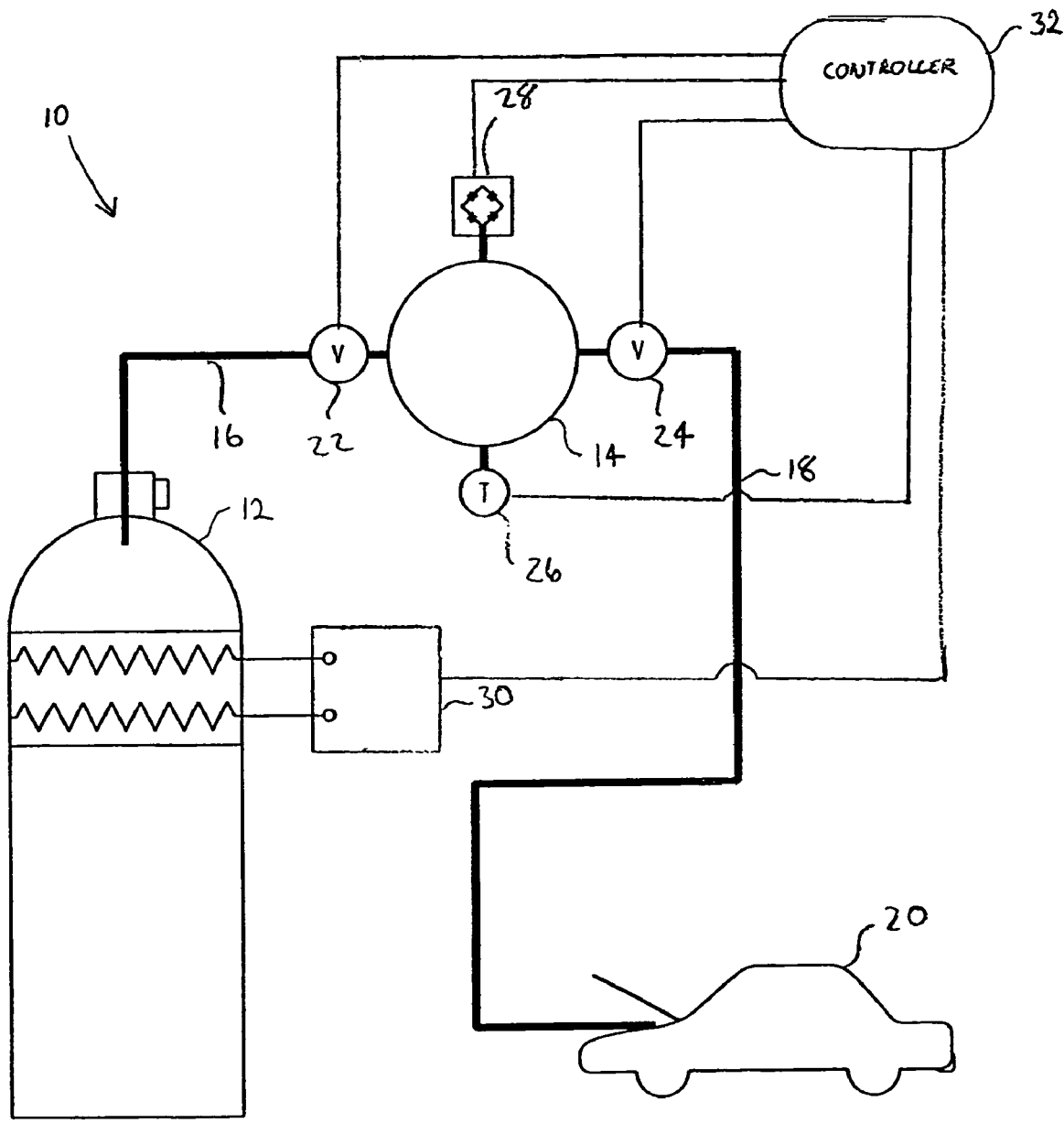
FIG. 1 is a schematic view of a refrigerant charging system, according to the disclosure.

An example of a refrigerant charging system 10 according to the disclosure is illustrated in FIG. 1. The refrigerant charging system includes a refrigerant source 12, a storage vessel 14, an input line 16, and an output line 18. The input line 16 fluidly connects the refrigerant source 12 to the storage vessel 14, and the input line 16 includes an input control valve 22 for allowing refrigerant to flow to/from the input line 16 from/to the storage vessel 14. The output line 18 fluidly connects the storage vessel 14 to a refrigeration system (not shown) to be charged of a vehicle 20, and the output line 18 includes an output control valve 24 for allowing refrigerant to flow to/from the storage vessel 18 from/to the refrigeration system of the vehicle 20.

The storage vessel 14 can also include a temperature sensor 26 and a pressure sensor 28 for measuring the temperature and pressure of the refrigerant within the storage vessel. The use of a temperature and pressure sensors 26, 28 to measure temperature and pressure of a fluid within a vessel is well known in the art, and the refrigerant charging system 10 is not limited as to any particular types or configurations of temperature and pressure sensors 26, 28.

The storage vessel 14 is not limited as to a particular size. However, reducing the size of the storage vessel 14 allows for greater sensitivity in charging the refrigeration system of the vehicle. As will be discussed in more detail below, the method of charging the refrigeration system can involve multiple occurrences of the refrigerant in the storage vessel 14 being discharged into the refrigeration system to be charged. By reducing the size of the storage vessel 14, the amount of refrigerant discharged during a particular cycle is reduced, which increases sensitivity. However, by reducing the size of the storage vessel 14, the number of cycles needed to fully charge the refrigeration system increases, which disadvantageously increases the amount of time to charge the refrigeration system.

The refrigerant source 12 is not limited as to a particular type of source for providing refrigerant. However, in a current aspect of the refrigerant charging system 10, the refrigerant source 12 is a constant-volume tank. The tank 12 of refrigerant can also include a heater 30 for adjusting the temperature of refrigerant within the tank 12. The use of a heater 30 to adjust the temperature of a fluid within a tank is well known in the art, and the present refrigerant charging system 10 is not limited as to any particular type or configuration of heater 30. However, in a current aspect of the refrigerant charging system 10, the heater 30 is an electrically-adjusted resistance band that can be wrapped around the tank 12.

The refrigerant charging system 10 can optionally include a controller 32 connected to at least one of the sensors 26, 28, control valves 22, 24 and heater 30. Although the control valves 22, 24 and the heater 30 can be operated manually, the controller 32 can be used to automatically control the operation of these devices. Additionally, information from the sensors 26, 28 can be sent to the controller 32, either automatically or manually, and the controller 32 can use this information during the control of the control valves 22, 24 and heater 30.

Figure 2:
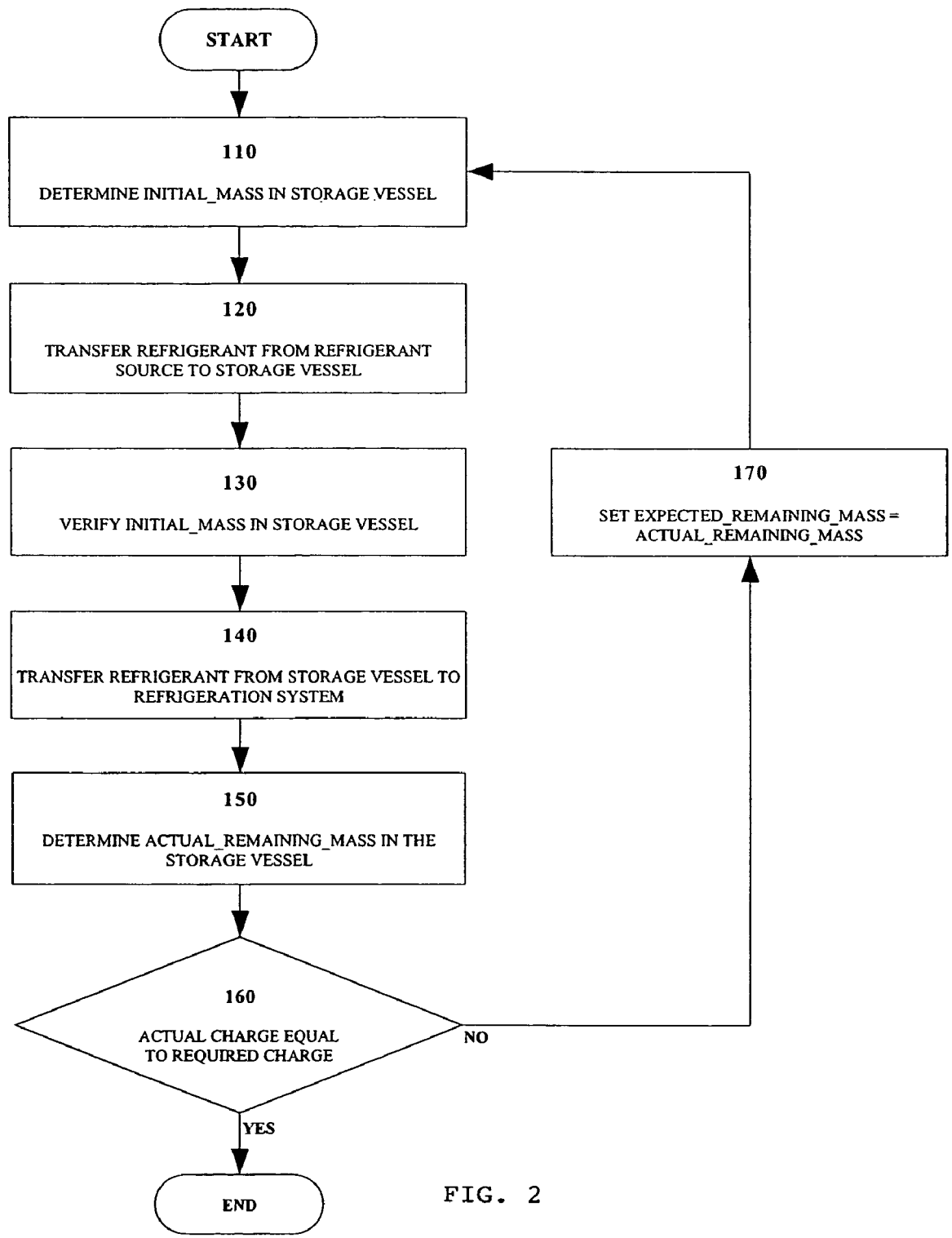
FIG. 2 is a flow chart of a method of charging a refrigeration system, according to the disclosure.

The operations of the refrigerant charging system 10 are schematically illustrated in the flow chart of FIG. 2. The mass of new refrigerant to be introduced into the refrigeration system is predefined by the manufacturer of the refrigeration system. In an initial step 110, the initial mass in the storage vessel 14 is determined. The initial mass consists of the required amount (mass) of refrigerant to be charged into the refrigeration system of the vehicle plus the expected remaining refrigerant using the following equation:

$$\text{Initial Mass} = \text{Required Mass} + \text{Expected Remaining Mass} \quad (1)$$

Although other techniques can be used to determine the expected remaining mass and the required mass of refrigerant to be charged into the refrigeration system of the vehicle, in a current aspect of the methodology of charging a refrigeration system, the expected remaining mass for the first charge is set to be equal to the required mass and the required mass of refrigerant is determined by using the temperature and pressure readings respectively from the temperature and pressure sensors 26, 28 in the following equation:

$$\text{Required Mass} = \text{Density} \times \text{Volume} \quad (2)$$

$$\text{Density} = [\text{Pressure} \times \text{Molecular Mass}]/[\text{Gas Constant} \times \text{Temperature}] \quad (3)$$

Density is a function of pressure and temperature with a known molecular mass (M) for specific refrigerant and Universal Gas Constant (R=8.314 (kJ/kmol ° K)). The calculation of density and initial mass can be done manually or by the controller 32. The volume used in for the calculation includes the volume of the storage vessel 14, the volume of the input line 16 between the input control valve 22 and the storage vessel 14, and the volume of the output line 18 between the storage vessel 14, and the output control valve 24.

In step 120, a mass of refrigerant is introduced from the refrigerant source 12 into the storage vessel 14 via the input line 16 by opening the input control valve 22. Based on the required refrigerant in the storage vessel 14 determined on step 110, the amount (mass) of refrigerant in the storage vessel is adjusted using the readings from the temperature and pressure sensors 26, 28 respectively during the fluid transfer. Although the pressure of the refrigerant in the refrigerant source 12 and the refrigerant in the storage vessel 14 need not be equalized prior closing the input control valve 22, in a current aspect of the methodology of charging a refrigeration system, the pressure of the refrigerant in the refrigerant source 12 and the refrigerant in the storage vessel 14 is equalized prior closing the input control valve 22. The closing of the input control valve 22 isolates the storage vessel 14 from the refrigerant source 12.

Once the initial mass of refrigerant in the storage vessel is transferred and isolated from the refrigerant source 12. In step 130, the initial mass on the storage tank can be verified using the equation 1, 2, and 3 to ensure accuracy. The output control valve 24 is then opened and refrigerant is allowed to flow from the storage vessel 14 through the output line 18 and into the refrigeration system of the vehicle 20 in step 140. The pressure of the refrigerant in the refrigeration system of the vehicle 20 and the refrigerant in the storage vessel 14 is allowed to equalize, and the output control valve 24 is then closed. The closing of the output control valve 24 isolates the storage vessel 14 from the refrigeration system of the vehicle 20.

After the storage vessel 14 is isolated from the refrigeration system of the vehicle 20, the actual remaining mass of refrigerant in the storage vessel 14 is determined in step 150. Although other techniques can be used to determine the mass of refrigerant in the storage vessel 14, in a current aspect of the methodology of charging a refrigeration system, the actual remaining mass of refrigerant is determined by using the temperature and pressure readings respectively from the temperature and pressure sensors 26, 28 in equation 3 and the following equation:

$$\text{Actual Remaining Mass} = \text{Density} \times \text{Volume} \quad (4)$$

After the actual remaining mass of refrigerant in the storage vessel 14 is calculated, a determination is made as to whether or not mass needs to be added or removed from the refrigeration system in the vehicle 20 in step 160. This involves comparing the required mass of refrigerant to be charged based on refrigeration system manufacturer specification with the amount of refrigerant actually introduced into the refrigeration system of the vehicle 20. The amount of refrigerant actually introduced into the refrigeration system of the vehicle 20 is calculated using the equation:

$$\text{Mass Introduced} = \text{Initial Mass} - \text{Actual Remaining Mass} \quad (5)$$

If the mass of refrigerant introduced into the refrigeration system equals the required mass +/− a predetermined deviation, the output line 18 can be disconnected from the refrigeration system of the vehicle 20. In certain situations when the actual mass of refrigerant introduced into the refrigeration system is less than the required mass of refrigeration, then starting from the second charge forward, the expected remaining mass on equation 1 is set to be the actual remaining mass from the previous charge in step 170 and steps 110 through 160 are repeated until the total mass of refrigerant introduced into the refrigeration system equals the required mass +/− the predetermined deviation.

When step 120 is repeated, the heater 30 connected to the refrigerant source 12 can be used to increase the temperature of the refrigerant entering into the storage vessel 14. This enables the refrigerant in the refrigerant source to be at a higher pressure than the remaining refrigerant in the storage vessel 14 and creates a flow of refrigerant from the refrigerant source 12 to the storage vessel 14. The transfer will result in an increase in pressure of the refrigerant in the storage vessel 14. When the pressure of the refrigerant in the storage vessel 14 is increased, the mass of refrigerant in the storage vessel 14 also increases, which enables additional mass to be introduced into the refrigeration system during step 140.

Use of the controller 32 allows for calculation of the initial mass, remaining mass, and introduced mass. The controller 32 can also operate the valves 22, 24 and heater 30 in a manner in which the pressure of the refrigerant being introduced into the storage vessel 14 can be closely controlled. In doing so, a need to repeat steps 110 through 160 can be minimized.

Through use of the present refrigerant charging system, refrigerant can be charged into a refrigeration system with accuracy comparable to or improved compared to prior technology used for the same purpose. Also, since the present refrigerant charging system can function without mass flow technology, the present refrigerant charging system is less expensive than those systems that employ mass flow technology and has increased accuracy, such as with carbon dioxide refrigerants. Furthermore, since the present refrigerant charging system does not employ a load cell, the system is less sensitive to vibration, which has been a source of inaccuracy with prior systems that employ a load cell.

The disclosed concepts may be practiced by employing conventional methodology and equipment. Accordingly, the details of such equipment and methodology are not set forth herein in detail. In the previous descriptions, numerous specific details are set forth, such as specific formulas, processes, techniques, etc., in order to provide a thorough understanding of the present invention. However, it should be recognized that the present invention may be practiced without resorting to the details specifically set forth.

Only an exemplary aspect of the present disclosure and but a few examples of its versatility are shown and described. It is to be understood that the present invention is capable of use in various other combinations and environments and is capable of changes or modifications within the scope of the inventive concept as expressed herein.

What is claimed is:

1. A refrigerant charging system for charging a refrigeration system with a refrigerant, comprising:
   a refrigerant source for supplying the refrigerant;
   a storage vessel;
   an input line fluidly connecting the refrigerant source to the storage vessel;
   an output line extending from the storage vessel and adapted for connection to the refrigeration system;
   a pressure sensor connected directly to the storage vessel;
   a temperature sensor connected directly to the storage vessel; and
   a controller communicating with the pressure and temperature sensors, the controller being configured to calculate and verify an initial mass of refrigerant within the storage vessel based on readings from the pressure and temperature sensors connected to the storage vessel, the initial mass being the sum of a required mass of refrigerant to be charged into the refrigerant system and a remaining refrigerant mass in the storage vessel, the remaining refrigerant mass in the storage vessel is an expected remaining refrigerant mass or an actual remaining refrigerant mass.

2. The refrigerant charging system according to claim 1, further comprising:
   an input control valve disposed between the storage vessel and the refrigerant source, and
   an output control valve disposed between the storage vessel and the refrigeration system.

3. The refrigerant charging system according to claim 2, wherein the controller is connected to the input and output control valves.

4. The refrigerant charging system according to claim 1, further comprising a heater connected to the refrigerant source and controlled by the controller.

5. The refrigerant charging system according to claim 4, wherein the heater is a electrically-adjusted resistance band.

6. The refrigerant charging system according to claim 1, further comprising a heater connected to the refrigerant source.

7. The refrigerant charging system according to claim 1, wherein the expected remaining refrigerant mass is set to equal the required mass of refrigerant to be charged into the refrigerant system.

8. The refrigerant charging system according to claim 1, wherein the controller is further configured to determine a mass of refrigerant actually introduced into the refrigerant system, the mass of refrigerant actually introduced into the refrigerant system is the difference between the initial mass of refrigerant within the storage vessel and the actual remaining mass of refrigerant within the storage vessel, the actual remaining mass of refrigerant within the storage vessel being determined by the controller based on readings from the pressure and temperature sensors.

9. The refrigerant charging system according to claim 1, wherein the controller is further configured to determine if the mass of refrigerant actually introduced into the refrigerant system falls within a predetermined deviation range of a required mass of refrigerant to be charged, the required mass of refrigerant to be charged being based on refrigeration system manufacturer's specification.

10. The refrigerant charging system according to claim 3, wherein the controller is further configured to operate the valves to control a pressure of the refrigerant being introduced into the storage vessel.

11. A method of charging a refrigeration system with refrigerant comprising the steps of:
  determining an initial mass of refrigerant for transferring into a storage vessel with a pressure sensor and a temperature sensor attached to the storage vessel;
  transferring refrigerant from a refrigerant source to the storage vessel;
  verifying the initial mass of refrigerant in the storage vessel after refrigerant from the refrigerant source is transferred to the storage vessel;
  transferring refrigerant from the storage vessel to the refrigeration system;
  fluidly disconnecting the storage vessel from the refrigeration system prior to the determining of a remaining mass of refrigerant within the storage vessel;
  determining the mass of refrigerant transferred to the refrigeration system; and
  comparing the calculated mass of refrigerant transferred to the refrigeration system with the determined mass of refrigerant for charging.

12. The method according to claim 11, wherein the mass of refrigerant transferred to the refrigeration system is determined by comparing the initial mass with a calculated remaining mass of refrigerant within the storage vessel.

13. The method according to claim 11, wherein during the determining of mass of refrigerant within the storage vessel, a volume of the storage vessel remains constant.

14. The method according to claim 11, further comprising fluidly disconnecting the refrigerant source from the storage vessel prior to the verifying of the initial mass of refrigerant.

15. The method according to claim 14, further comprising heating the refrigerant in the refrigerant source prior to disconnecting the refrigerant source from the storage vessel.

16. The method of according to claim 11, further comprising repeating the steps of transferring refrigerant from the refrigerant source to the storage vessel and transferring refrigerant from the storage vessel to the refrigeration system, if a total determined mass of refrigerant transferred to the refrigeration system does not equal the determined mass of refrigerant for charging.

17. The method of according to claim 11 further comprising controlling a pressure of the refrigerant being introduced into the storage vessel.

* * * * *